US012499669B2

United States Patent
Deng et al.

(10) Patent No.: US 12,499,669 B2
(45) Date of Patent: Dec. 16, 2025

(54) AREA EXTRACTION METHOD AND AREA EXTRACTION SYSTEM

(71) Applicant: Hitachi, Ltd., Tokyo (JP)

(72) Inventors: Ziwei Deng, Tokyo (JP); Naoto Akira, Tokyo (JP); Tomoaki Yoshinaga, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 378 days.

(21) Appl. No.: 18/176,519

(22) Filed: Mar. 1, 2023

(65) Prior Publication Data
US 2023/0368508 A1 Nov. 16, 2023

(30) Foreign Application Priority Data

May 12, 2022 (JP) ................. 2022-079073

(51) Int. Cl.
*G06V 10/82* (2022.01)
*G06V 10/22* (2022.01)
*G06V 10/26* (2022.01)
*G06V 10/77* (2022.01)
*G06V 10/776* (2022.01)
*G06V 10/778* (2022.01)
*G06V 10/94* (2022.01)

(52) U.S. Cl.
CPC ........ *G06V 10/7788* (2022.01); *G06V 10/225* (2022.01); *G06V 10/26* (2022.01); *G06V 10/7715* (2022.01); *G06V 10/776* (2022.01); *G06V 10/82* (2022.01); *G06V 10/945* (2022.01)

(58) Field of Classification Search
CPC .. G06V 10/7788; G06V 10/225; G06V 10/26; G06V 10/7715; G06V 10/776; G06V 10/82; G06V 10/945; G06V 10/25
See application file for complete search history.

(56) References Cited

U.S. PATENT DOCUMENTS 10,713,794 B1 * 7/2020 He ..................... G06N 3/084

OTHER PUBLICATIONS

Liu, Q. et al. "PseudoClick: Interactive Image Segmentation with Click Initiation." arvix:2207.05282v2. Jul. 27, 2022. (Year: 2022).*

(Continued)

*Primary Examiner* — Vincent Rudolph
*Assistant Examiner* — Keely Gwynne Yeargin
(74) *Attorney, Agent, or Firm* — Volpe Koenig

(57) ABSTRACT

An area extraction method includes acquiring a captured image, generating a feature map using the captured image, extracting a candidate bounding box indicating an area in which an object exists in the captured image using the feature map, a segmentation step of generating a mask that is a bounding box indicating the area in which the object exists using the feature map and the candidate bounding box, acquiring input information which is input by a user regarding the object in the captured image, extracting the candidate bounding box using the feature map and the input information, and updating the feature map using the candidate bounding box extracted in the area estimation step and the input information. Wherein the candidate bounding box can be extracted further using the mask generated in the segmentation step, and the feature map can be updated using the mask generated in the segmentation step.

6 Claims, 7 Drawing Sheets

(56) References Cited

OTHER PUBLICATIONS

Dai, J. et al. "BoxSup: Exploiting Bounding Boxes to Supervise Convolutional Networks for Semantic Segmentation." 2015 IEEE International Conference on Computer Vision. 2015. (Year: 2015).*
Benenson, Rodrigo, et al., "Large-Scale Interactive Object Segmentation With Human Annotators," 2019 IEEE/CVF Conference on Computer Vision and Pattern Recognition (CVPR) (2019): 11692-11701.

* cited by examiner

AREA EXTRACTION METHOD AND AREA EXTRACTION SYSTEM

BACKGROUND OF THE INVENTION

Field of the Invention

The present invention relates to an area extraction method and an area extraction system.

Description of the Related Art

In recent years, as a result of the appearance of deep neural networks (DNNs), image segmentation in which an area of an object is predicted in pixel unit has been dramatically developed, and application in the real world is expected. However, the performance of a DNN depends on a large amount of learning data, which requires annotation by manpower. Thus, in recent years, an interactive segmentation method that enables annotation to an image in a semi-automatic manner has been studied. Further, concerning the DNN, to further simplify a manual step and reduce time and cost, an interactive segmentation work is also proposed. In Benenson, Rodrigo, Stefan Popov and Vittorio Ferrari. "Large-Scale Interactive Object Segmentation With Human Annotators", 2019 IEEE/CVF Conference on Computer Vision and Pattern Recognition (CVPR) (2019): 11692-11701, it is proposed to, first, automatically predict a mask of an object using a segmentation DNN model, then, perform input through user interaction by clicking, drawing of an area box, or the like, using another interactive segmentation DNN model to provide guidance to a model concerning a location where the mask is to be corrected.

If a sufficiently learned DNN model is used in an actual application, unlearned target categories gradually increase, and thus, accuracy thereof gradually decreases. This similarly applies to an annotation system using deep learning, and a model is required to be frequently retrained on newly obtained data to maintain accuracy. In the method disclosed in Benenson, Rodrigo, Stefan Popov and Vittorio Ferrari. "Large-Scale Interactive Object Segmentation With Human Annotators", 2019 IEEE/CVF Conference on Computer Vision and Pattern Recognition (CVPR) (2019): 11692-11701, annotation is performed using two DNN models, which requires a lot of time and trouble to update a model. A method for reducing cost for frequent retraining of a DNN model is required.

SUMMARY OF THE INVENTION

According to the 1st aspect of the present invention, an area extraction method to be executed by a computer, the area extraction method includes an image acquisition step of acquiring a captured image, a feature extraction step of generating a feature map using the captured image, an area extraction step of extracting a candidate bounding box that is a bounding box indicating an area in which an object exists in the captured image using the feature map, a segmentation step of generating a mask that is a bounding box indicating the area in which the object exists in the captured image using the feature map and the candidate bounding box, a user input step of acquiring input information which is input by a user and which is information regarding the object in the captured image, an area estimation step of extracting the candidate bounding box using the feature map and the input information, and an interaction encoding step of updating the feature map using the candidate bounding box extracted in the area estimation step and the input information, wherein in the area estimation step, further, the candidate bounding box can be extracted further using the mask generated in the segmentation step, and in the interaction encoding step, further, the feature map can be updated using the mask generated in the segmentation step.

According to the 2nd aspect of the present invention, an area extraction system includes an image acquisition unit configured to acquire a captured image, a feature extraction unit configured to generate a feature map using the captured image, an area extraction unit configured to extract a candidate bounding box that is a rectangle bounding box indicating an area in which an object exists in the captured image using the feature map, a segmentation head configured to generate a mask that is a closed area along a contour of the object in the captured image using the feature map and the candidate bounding box, a user input unit configured to acquire input information which is input by a user and which is information regarding the object in the captured image, an area estimation unit configured to extract the candidate bounding box using the feature map and the input information, and an interaction encoding unit configured to update the feature map using the candidate bounding box extracted by the area estimation unit and the input information, wherein the area estimation unit can further extract the candidate bounding box further using the mask generated by the segmentation head, and the interaction encoding unit can further update the feature map using the mask generated by the segmentation head.

According to the present invention, it is possible to reduce cost for updating a neural network model.

DETAILED DESCRIPTION OF THE PREFERRED EMBODIMENT

Embodiment

An embodiment of an arithmetic apparatus and an area extraction method according to the present invention will be described below with reference to FIG. 1 to FIG. 7.
(Hardware Configuration)

Many aspects which will be disclosed in the present specification will be described as a sequence of operation to be executed by a computer device. Further, various kinds of operation which will be described in the present specification may be executed by a specific circuit, for example, an application specific integrated circuit (ASIC), a program command to be executed by one or more processors, or a combination of the both. Further, the sequence of the operation which will be described in the present specification may be stored in an arbitrary computer readable storage medium as a set of computer commands and a processor may be caused to execute a function corresponding to the sequence of the operation upon execution. Thus, various aspects of the present disclosure may be embodied in a number of different forms, all of which are incorporated into a technical scope of the present invention.

An aspect of an embodiment of the present disclosure relates to a neural network. Typically, a "neural network" is a computation model having functions such as machine learning and pattern recognition. The neural network may be applied to various operation environments such as a local apparatus, a server/client configuration and a distributed network.

Figure 1:
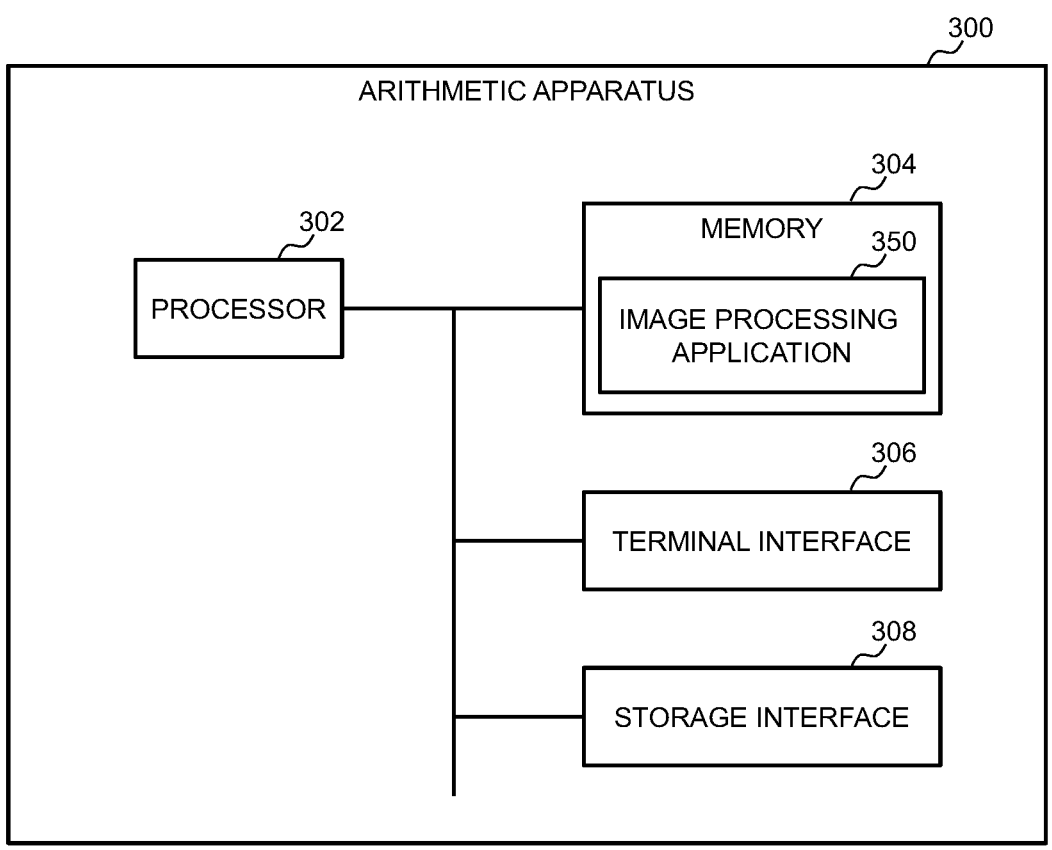
FIG. 1 is a hardware configuration diagram of an arithmetic apparatus

FIG. 1 is a hardware configuration diagram of an arithmetic apparatus 300. Various mechanisms and apparatus of the embodiment which will be disclosed in the present specification may be applied to an arbitrary appropriate computing system. Main components of the arithmetic apparatus 300 include one or more processors 302, a memory 304, a terminal interface 306 and a storage interface 308. These components are coupled via a communication bus.

The processor 302 is a central processing unit and includes one or more arithmetic cores. The memory 304 may include a random access semiconductor memory, a storage apparatus or a storage medium (either volatile or non-volatile) for storing data and programs. The memory 304 may store all or part of programs, modules and data structures for implementing functions which will be described in the present specification. For example, the memory 304 may store an image processing application 350. In one embodiment, the image processing application 350 may include commands or description for executing functions which will be described later on the processor 302.

The image processing application 350 may be implemented on hardware via a semiconductor device, a chip, a logical gate, a circuit, a circuit card and/or other physical hardware devices in place of or in addition to a processor-based system. The image processing application 350 may include data other than commands or description.

The terminal interface 306 allows attachment of a user output device such as a video display apparatus and a speaker TV, a user input device such as a keyboard, a mouse, a keypad, a touch pad, a trackball, a button, a light pen and other pointing devices, and the like. A user may input data and an instruction to the arithmetic apparatus 300 by operating the user input device using a user interface and may receive output data from the arithmetic apparatus 300.

The storage interface 308 allows attachment of one or more disk drives and a storage apparatus (not illustrated). Content of the memory 304 may be stored in the storage apparatus and read from the storage apparatus as appropriate. The storage apparatus may be a magnetic disk drive storage apparatus, an array of disk drives constituted to be looked as if it were a single disk drive or other storage apparatuses. The network interface 318 may provide a communication path so that the arithmetic apparatus 300 and other devices can perform communication with each other.

The arithmetic apparatus 300 may be a device such as a multi-user main bounding box computer system, a single user system and a server computer that does not have a user interface and receives requests from other computer systems (client). Further, the arithmetic apparatus 300 may be a desktop computer, a portable computer, a notebook computer, a tablet computer, a pocket computer, a telephone, a smartphone or any other appropriate electronic equipment.

(Functional Configuration)

Figure 2:
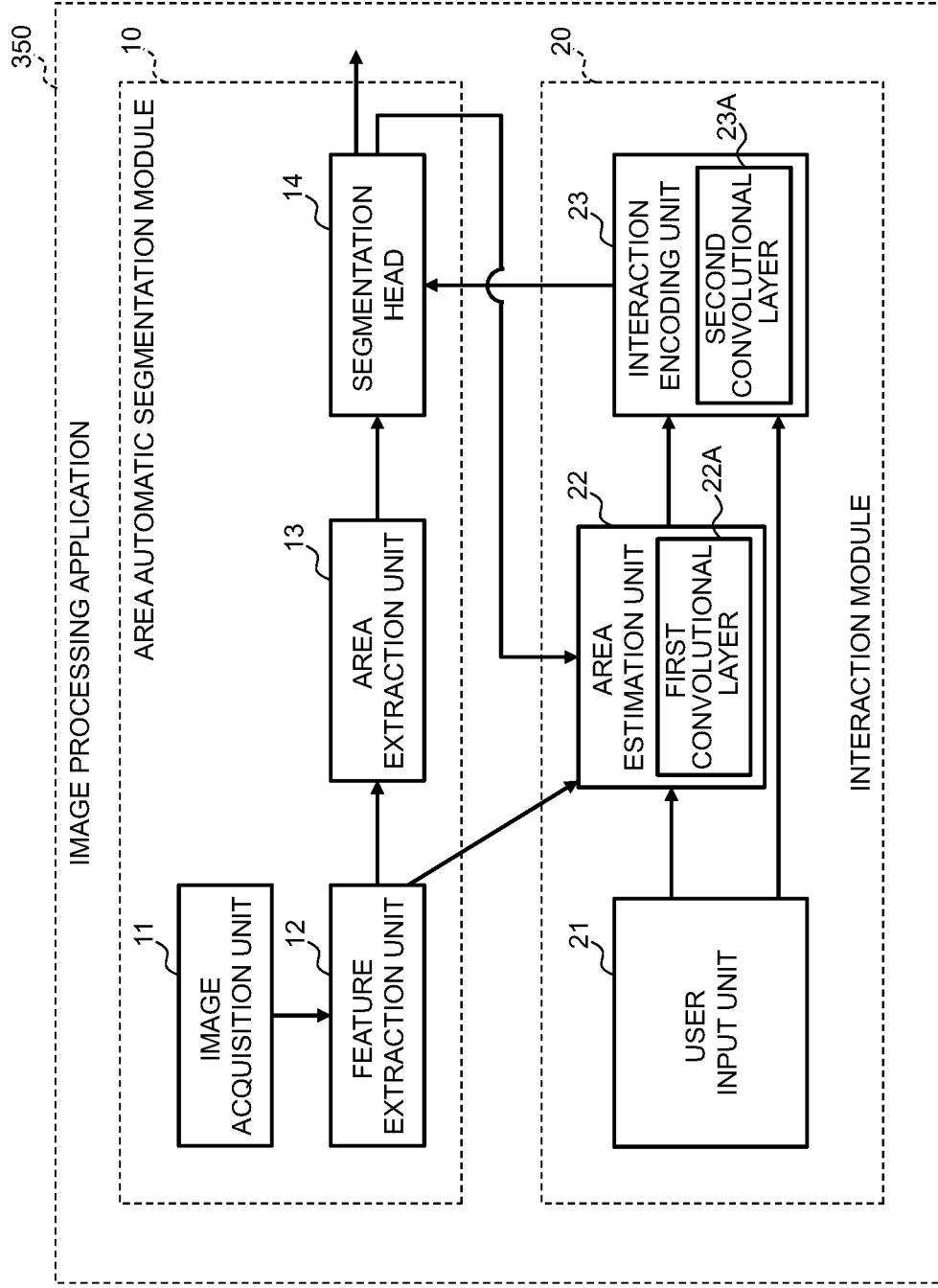
FIG. 2 is a functional block diagram of an image processing application

FIG. 2 is a functional block diagram illustrating functions of the image processing application 350 as functional blocks. The image processing application 350 includes an area automatic segmentation module 10 and an interaction module 20. Note that while not illustrated in FIG. 2, the image processing application 350 includes a loss calculation unit 30. The area automatic segmentation module 10 includes an image acquisition unit 11, a feature extraction unit 12, an area extraction unit 13 and a segmentation head 14. The interaction module 20 includes a user input unit 21, an area estimation unit 22 and an interaction encoding unit 23. The area estimation unit 22 includes a first convolutional layer 22A that is a learned neural network. The interaction encoding unit 23 includes a second convolutional layer 23A that is a learned neural network.

The image acquisition unit 11 acquires a captured image of an object and outputs the captured image to the feature extraction unit 12. The image acquisition unit 11 utilizes the terminal interface 306. The feature extraction unit 12 generates a feature map using the captured image acquired by the image acquisition unit 11. The feature map is output to the area extraction unit 13 and the area estimation unit 22. The feature extraction unit 12 can be implemented by, for example, a convolutional neural network (CNN), a vision transformer, a combination of the CNN and the vision transformer, or the like.

The area extraction unit 13 extracts a candidate bounding box that is a rectangle bounding box indicating an area in which the object exists in the captured image using a publicly known method using the feature map output by the feature extraction unit 12. The number of objects to be extracted by the area extraction unit 13 is zero or one or more. The area extraction unit 13 can, for example, use a publicly known region proposal network (RPN). The segmentation head 14 generates and outputs a mask that is a closed area along a contour of the object in the captured image using the output of the area extraction unit 13 or the interaction module 20. In other words, there are a case where the segmentation head 14 performs processing using the output of the area extraction unit 13 and a case where the segmentation head 14 performs processing using the output of the interaction module 20. Note that information on the mask itself calculated by the segmentation head 14 may be output to outside of the image processing application 350 as a calculation result, or the image processing application 350 may further perform processing using the mask.

The user input unit 21 acquires input information which is input by the user and which is information regarding the object in the captured image and outputs the input information to the area estimation unit 22 and the interaction encoding unit 23. The user input unit 21 is, for example, an input interface that receives a signal from a pointing device operated by the user. The user inputs information regarding existence of the object in the captured image using the pointing device. The information regarding existence of the object is information on a position or an area in which the object exists and information on a position or an area in which the object does not exist.

One example of operation of the user input unit 21 is as follows. For example, if the user moves a pointer of a mouse and depresses a left button of the mouse, that is, performs left click operation on the captured image, the user input unit 21 outputs information on a coordinate on the clicked captured image to the area estimation unit 22 as a position at which the object exists. Note that in the following description, action of the user indicating a position at which the object exists will be also referred to as "positive click". Further, if the user depresses a right button of the mouse, that is, performs right click operation on the captured image, the user input unit 21 outputs information on a coordinate on the clicked captured image to the area estimation unit 22 and the interaction encoding unit 23 as a position at which the object does not exist.

The area estimation unit 22 calculates a candidate bounding box using the feature map output by the feature extraction unit 12 and the input information output by the user input unit 21. However, there is also a case where the area estimation unit 22 further uses the mask information output by the area automatic segmentation module 10 in calculation of the candidate bounding box. Specifically, when the user input unit 21 accepts operation from the user, in a case where the segmentation head 14 has already output mask information, the area estimation unit 22 calculates the candidate bounding box by utilizing the mask information as an initial mask. Further, when the user input unit 21 accepts operation from the user, in a case where the segmentation head 14 has not output mask information yet, the area estimation unit 22 calculates the candidate bounding box without using an initial mask.

The interaction encoding unit 23 rewrites part of the feature map using the input information output by the user input unit 21, the candidate bounding box output by the area estimation unit 22 and the feature map output by the feature extraction unit 12 and outputs the rewritten feature map to the segmentation head 14. However, the feature map cut out using the input information output by the user input unit 21 and the candidate bounding box output by the area estimation unit 22 may be input to the interaction encoding unit 23.

Figure 3:
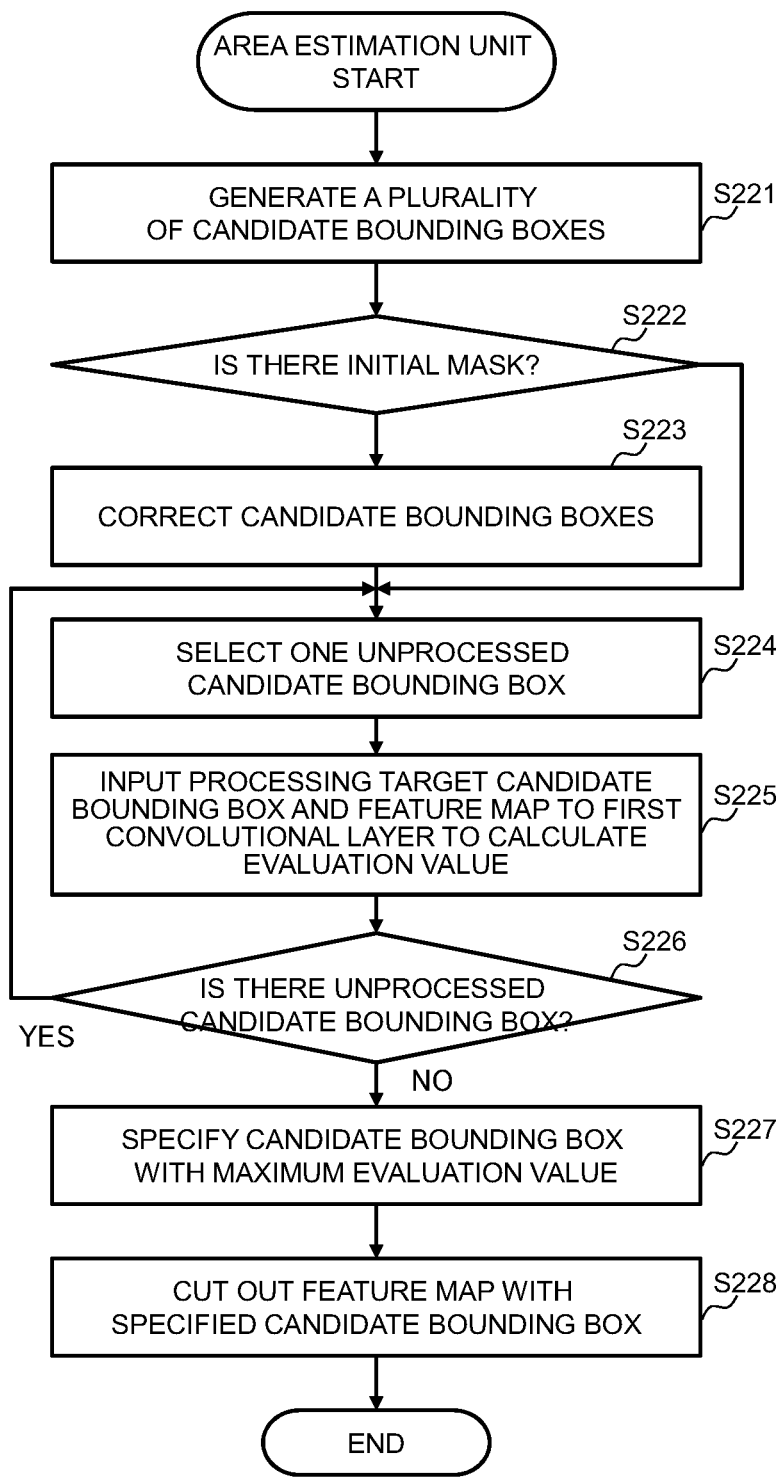
FIG. 3 is a flowchart illustrating processing of an area estimation unit

FIG. 3 is a flowchart illustrating processing of the area estimation unit 22. The area estimation unit 22 generates a plurality of candidate bounding boxes on the basis of input operation by the user in step S221. For example, the area estimation unit 22 generates rectangle candidate bounding boxes with different widths and heights around a position designated by the user. The respective rectangles have a constant aspect ratio or may have a plurality of types of aspect ratios. For example, a total of nine candidate bounding boxes having short sides of 100 pixels, 200 pixels and 300 pixels and having aspect ratios of 1:2, 1:1 and 2:1 are generated.

In the subsequent step S222, the area estimation unit 22 determines whether or not an initial mask exists. In a case where the area estimation unit 22 determines that an initial mask exists, the processing proceeds to step S223, and in a case where the area estimation unit 22 determines that an initial mask does not exist, the processing proceeds to step S224. A case where an initial mask exists is a case where the area estimation unit 22 operates after the segmentation head 14 operates. In step S223, the area estimation unit 22 corrects the candidate bounding boxes generated in step S221 on the basis of the initial mask. For example, the area estimation unit 22 expands the candidate bounding boxes so that an area of the initial mask is included in all the candidate bounding boxes. In step S224, the area estimation unit 22 selects one unprocessed candidate bounding box. In the following description, the candidate bounding box selected in the present step will be referred to as a "processing target candidate bounding box".

In the subsequent step S225, the area estimation unit 22 inputs the feature map generated by the feature extraction unit 12 and the processing target candidate bounding box to the first convolutional layer 22A to calculate an evaluation value. The first convolutional layer 22A is a learned neural network having at least a convolutional layer. The first convolutional layer 22A performs learning in advance so as to output a numerical value of a likelihood of the processing target bounding box enclosing the object in the feature map.

In the subsequent step S226, the area estimation unit 22 determines whether or not an unprocessed candidate bounding box exists. In a case where the area estimation unit 22 determines that an unprocessed candidate bounding box exists, the processing returns to step S224, and in a case where the area estimation unit 22 determines that an unprocessed candidate bounding box does not exist, the processing proceeds to step S227. In step S227, the area estimation unit 22 specifies a candidate bounding box having a maximum evaluation value among the evaluation values calculated in step S225. In step S228, the area estimation unit 22 cuts out the feature map using the candidate bounding box specified in step S227 and outputs the cut out feature map to the interaction encoding unit 23.

Figure 4:
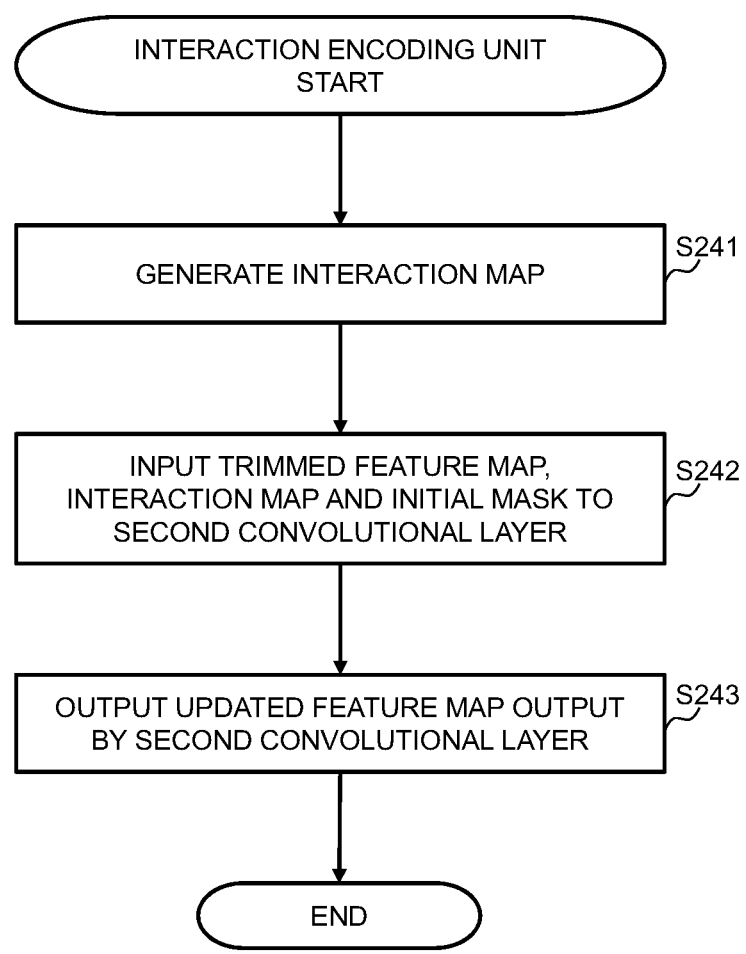
FIG. 4 is a flowchart illustrating processing of an interaction encoding unit

FIG. 4 is a flowchart illustrating processing of the interaction encoding unit 23. The interaction encoding unit 23 first generates an interaction map on the basis of the input information obtained by the user input unit 21 in step S241. The interaction map is, for example, a map in which a value of "1" is allocated to a position indicated by the user as a position where the object exists and "0" is allocated to all the other positions or a map having Gaussian distribution from "0" to "1" around the position indicated by the user. The interaction map has one or more channels to include one or more types of interaction.

In the subsequent step S242, the interaction encoding unit 23 inputs the trimmed feature map, the interaction map generated in step S241 and the initial mask to the second convolutional layer 23A. The trimmed feature map is a feature map obtained by cutting the feature map output by the feature extraction unit 12 using the candidate bounding box output by the area estimation unit 22. Note that in a case where an initial mask does not exist, a blank map filled with zero is input in place of an initial mask. The second convolutional layer 23A is a learned neural network and rewrites, that is, updates the feature map on the basis of the interaction map.

In a case where positive click is input as the user interaction, these are coupled to a (N+a) channel map. "N" is the number of channels of the feature map, and "a" in this case is one interaction map and one initial mask. There is a case where "a" exceeds 2 in a case of other types of interaction such as negative click and stroke. In the subsequent step S243, the interaction encoding unit 23 outputs the updated feature map output by the second convolutional layer 23A to the segmentation head 14 and ends the processing illustrated in FIG. 4.

(Learning Method)

Figure 5:
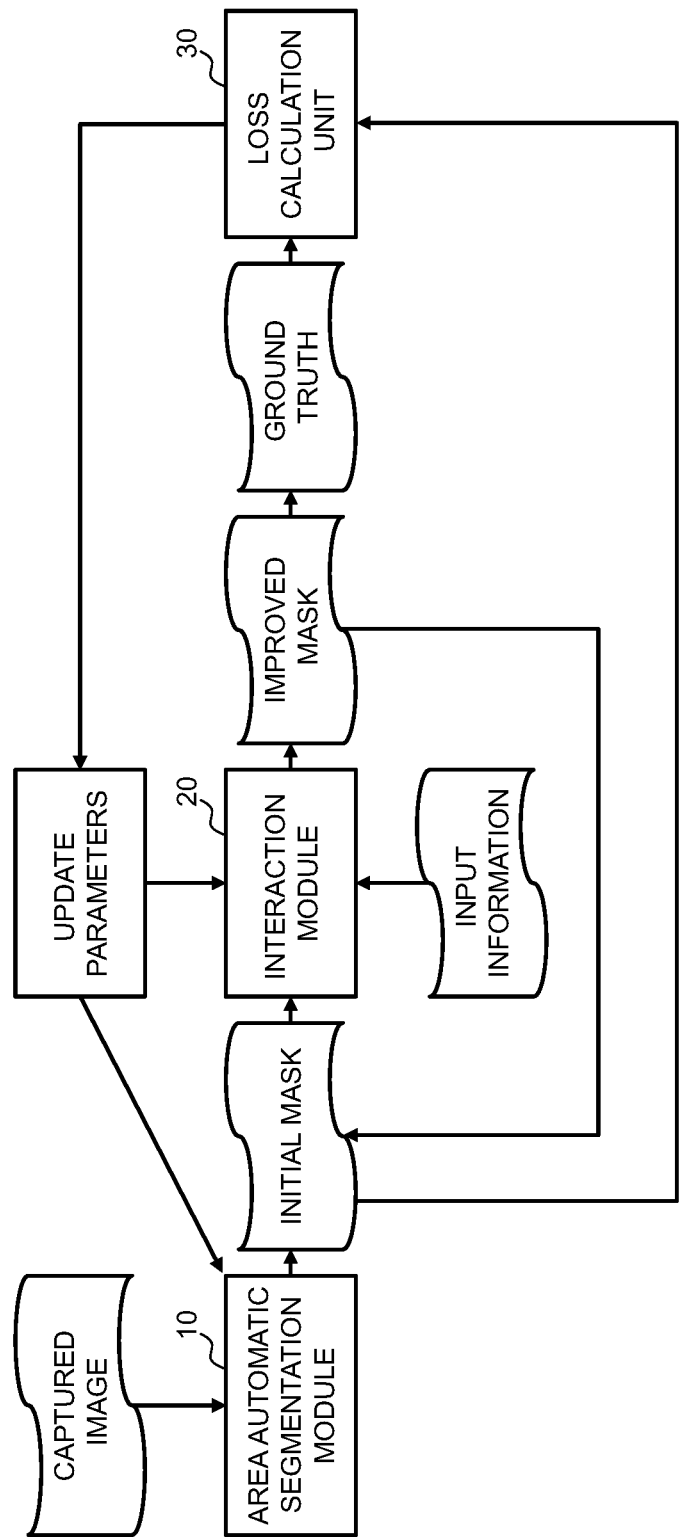
FIG. 5 is a flowchart illustrating processing of the interaction encoding unit

FIG. 5 is a schematic view illustrating a learning method in the arithmetic apparatus 300. In FIG. 5, processing is described in a simplified manner to describe outline of learning. First, the area automatic segmentation module 10 creates a mask using the captured image. The mask created first will be referred to as an "initial mask". Further, a case will be assumed here where the user does not satisfy accuracy of the initial mask and inputs information indicating a position of the object in the captured image. In this case, the interaction module generates an "improved mask" which is a new mask by updating the feature map using the feature map generated in advance by the feature extraction unit 12 of the area automatic segmentation module 10 and the input information input by the user and the initial mask and inputting the updated feature map to the segmentation head 14.

In a case where the user determines pass or failure of the improved mask, and in a case where a failure determination result is obtained, that is, it is determined that further improvement is required, the improved mask is input to the interaction module 20 as an initial mask. In a case where a pass determination result on the improved mask is obtained, that is, it is determined that the improved mask has sufficient accuracy, the improved mask is input to the loss calculation unit 30 as a ground truth. An instruction clearly indicating a pass or failure determination result on the improved mask by the user may be input to the arithmetic apparatus 300, or a failure determination result may be indirectly indicated by inputting new input information, or a pass determination result may be indirectly indicated by not performing input for a predetermined period.

The loss calculation unit 30 calculates a learning loss L as indicated in the following expression 1 using the ground truth and the initial mask and updates parameters of the area automatic segmentation module 10 and the interaction module 20. In other words, the loss calculation unit 30 calculates the learning loss L using masks generated first and last by the area automatic segmentation module 10.

[Expression 1]

$$L = \frac{1}{2N} \sum_{n \in N} |M_p^n - M_g^n| + \frac{1}{2} |M_p' - M_g'| \quad \text{(Expression 1)}$$

However, in expression 1, N indicates a total number of areas extracted by the area extraction unit 13, and $M''_p$ indicates an initial mask in the n-th area included in the captured image, and $M''_g$ indicates a ground truth in the n-th area included in the captured image. Further, $M'_p$ indicates an initial mask in an area in which the user performs interaction, and $M'_g$ indicates a ground truth in an area in which the user performs interaction.

An anterior half of expression 1 means a difference between the initial mask and the ground truth, targeted at all objects included in the captured image, and is a loss for updating parameters of the area automatic segmentation module 10. A posterior half of the expression means a difference between the updated mask that is incompletely updated and the ground truth, and a is a loss for updating parameters of a shared portion of the interaction module and the area automatic segmentation module 10 such as the feature extraction unit 12 and the segmentation head 14.

The parameters of the interaction module 20 are updated only in a case where the interactive segmentation is processed two or more times, so that it is possible to achieve optimization to reduce the number of iterations required for refining the mask. The whole network including the area automatic segmentation module 10 and the interaction module 20 can be learned end-to-end, so that the parameters can be updated at a time, and other calculation other than the network is not required. This is because the area automatic segmentation module 10 and the interaction module 20 are designed so as to share the mask output with the same feature extraction unit 12.

Further, in a case where a head for multi-class classification is also assumed, it is necessary to add a classification loss for calculating a difference between a ground truth and a prediction result in a class manually corrected by the user.

There is also a method for learning an unlearned class other than a method in which classification accuracy of the learned class is improved. In a case of attaching a label to an object in an unlearned class, first, a system cannot automatically predict the class, so that the user requires to add a class label. Thus, online learning is performed, or learning is performed after images are collected by a number of tries. For example, in a latent space, by decreasing a distance between feature amounts of the same class and increasing a distance between feature amounts of different classes, a cluster of new classes can be learned. Thus, the system gradually learns prediction of new classes, so that it is possible to pursue further automation and reduce time and cost required for annotation.

Note that the loss calculation unit 30 acquires a pass or failure determination result on the updated mask by the user using the terminal interface 306 to determine whether or not to handle the updated mask as the ground truth. However, there is also a case where a pass or failure determination result on the improved mask is indicated by the user inputting new input information, and thus, in this case, the loss calculation unit 30 may utilize the output of the user input unit 21.

(Application to X-Ray Examination Apparatus)

Figure 6:
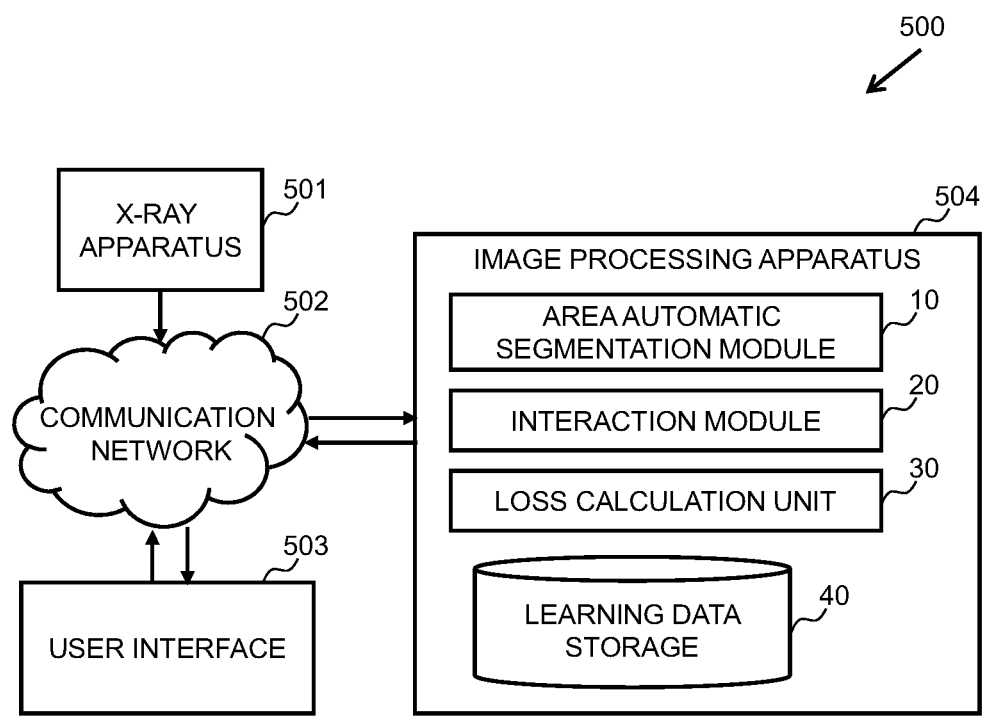
FIG. 6 is a view illustrating an example where an image processing apparatus is applied to an X-ray examination system

FIG. 6 is a view illustrating an example where the arithmetic apparatus 300 is applied to an X-ray examination system 500. The X-ray examination system 500 includes an X-ray apparatus 501, a communication network 502, a user interface 503 and an image processing apparatus 504. The X-ray apparatus 501, the user interface 503 and the image processing apparatus 504 are coupled via a communication network 502.

The communication network 502 may include, for example, a local area network (LAN), a wide area network (WAN), a satellite network, a cable network, a wireless LAN network or an arbitrary combination thereof. Further, the X-ray apparatus 501, the user interface 503 and the image processing apparatus 504 may be coupled in either a wired manner or a wireless manner.

The X-ray apparatus 501 is an apparatus that captures an X-ray image. The X-ray apparatus 501 includes, for example, an X-ray generator that emits an X-ray and an X-ray detector that detects and analyzes a reflected X-ray. A type of the X-ray apparatus 501 is not particularly limited, and an X-ray apparatus for baggage, a backscatter X-ray examination apparatus or a medical X-ray apparatus may be used. The X-ray apparatus 501 captures an X-ray image of a predetermined subject and transmits the X-ray image to the user interface 503 and the image processing apparatus 201 via the communication network 502. In other words, in this example, the captured image to be processed by the image processing apparatus 504 is the X-ray image.

Note that while FIG. 6 illustrates a configuration in a case where the X-ray apparatus 501 is included as a component that processes an X-ray image as an example, the present invention is not limited to this, and the X-ray apparatus 501 may be, for example, an arbitrary camera, sensor or other apparatuses that provide an input image to be subjected to image processing. The user interface 503 is a display that presents the captured image to the user, and a mouse, a keyboard, and the like, that accept operation from the user.

The image processing apparatus 504 includes the area automatic segmentation module 10, the interaction module 20, the loss calculation unit 30 and a learning data storage 40. Operation of the area automatic segmentation module 10, the interaction module 20 and the loss calculation unit 30 is as described above. The learning data storage 40 stores data for learning, and the image processing apparatus 504 can perform learning in advance using the data stored in the learning data storage 40.

Figure 7:
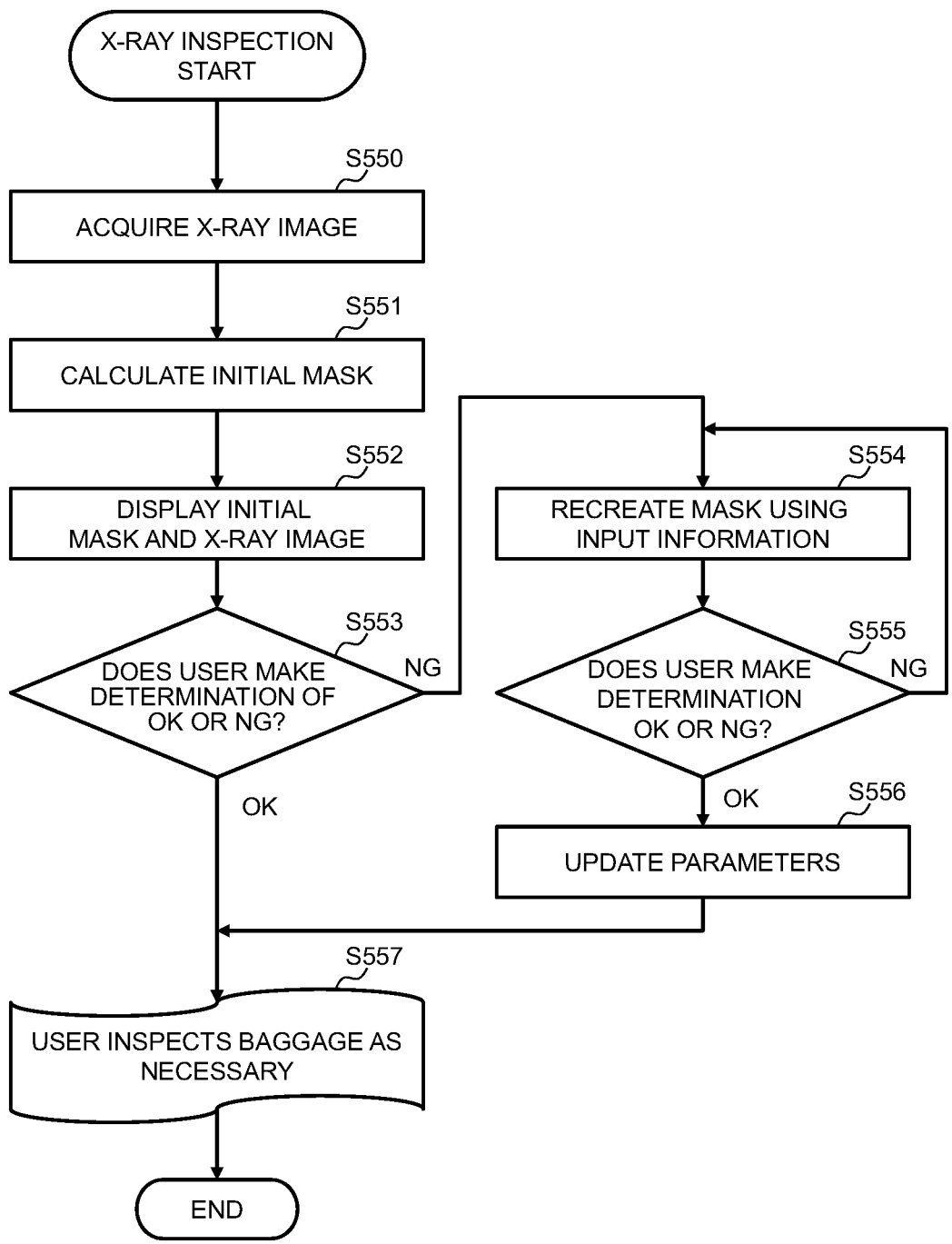
FIG. 7 is a flowchart illustrating operation of the X-ray examination system

FIG. 7 is a flowchart illustrating operation of the X-ray examination system 500. However, FIG. 7 illustrates operation of the user by a shape of bounding boxes being made different. First, in step S550, the X-ray apparatus 501 captures an X-ray image, and the image acquisition unit 11 of the image processing apparatus 504 acquires the X-ray image. In the subsequent step S551, the area automatic segmentation module 10 of the image processing apparatus 504 calculates an initial mask. In the subsequent step S552, the user interface 503 presents the X-ray image captured in step S550 and the initial mask calculated in step S551 to the user.

In the subsequent step S553, the image processing apparatus 504 acquires a determination result on the initial mask by the user via the user interface 503 and determines whether the determination result is OK or NG. In a case where the image processing apparatus 504 determines that the user makes OK determination, that is, makes positive evaluation which indicates that the initial mask has sufficient accuracy and which indicates a pass determination result, the processing proceeds to step S557. In a case where the image processing apparatus 504 determines that the user makes NG determination, that is, makes negative evaluation indicating that accuracy of the initial mask is not sufficient and the initial mask should be improved, the processing proceeds to step S554. For example, the image processing apparatus 504 determines that the user makes NG determination if the user inputs information regarding the object in the captured image using the user interface 503, for example, position information of the object through click operation, and the image processing apparatus 504 determines that the user makes OK determination if there is no user operation to the user interface 503 within a predetermined period.

In the subsequent step S554, the image processing apparatus 504 regenerates a mask using the interaction module 20 and the segmentation head 14. In the subsequently step S555, the image processing apparatus 504 determines determination by the user on the mask created in step S554 in a similar manner to step S553 and, in a case where it is determined that the user makes positive determination, the processing proceeds to step S556, and in a case where the user makes negative determination, the processing returns to step S554. In other words, the processing in step S554 is repeated until the user makes positive determination.

In step S556, the image processing apparatus 504 calculates a learning loss L indicated in expression 1 described above using the initial mask calculated in step S551 and the mask created last in step S554, which is a ground truth, that is, the mask for which the user makes positive determination and updates the parameters of the neural network included in the image processing apparatus 504. In step S557, the user who saw the X-ray image performs baggage inspection as necessary. FIG. 7 has been described above.

By utilizing the present system in X-ray baggage inspection, it is possible to improve accuracy of the network and continuously learn new objects without regular offline learning, so that it is possible to maintain high efficiency of an inspection process. Further, compared to a two-step scheme in related art, cost required for updating a network in an actual application can be reduced. Particularly, the present system is suitable for an application scene that requires human cooperation. Note that the respective functional units included in the image processing apparatus 201 may be software modules that constitute the image processing application 350 in the arithmetic apparatus 300 illustrated in FIG. 1 or may be independent dedicated hardware devices. Further, the above-described functional units may be implemented in the same computing environment or may be implemented in distributed computing environments.

According to the configuration described above, by the image processing apparatus 504 processing the input image and user interaction accepted from external apparatuses such as the X-ray apparatus 501 and the user interface 503 via the communication network 502, it is possible to predict an area of an object for each object.

According to a first embodiment described above, the following operational effects can be obtained.

(1) The area extraction system 1 includes the image acquisition unit 11 configured to acquire a captured image, the feature extraction unit 12 configured to generate a feature map using the captured image, the area extraction unit 13 configured to extract a candidate bounding box that is a rectangle bounding box indicating an area in which an object exists in the captured image using the feature map, the segmentation head 14 configured to generate a mask that is a closed area along a contour of the object in the captured image using the feature map and the candidate bounding box, the user input unit 21 configured to acquire input information which is input by the user and which is information regarding the object in the captured image, the area estimation unit 22 configured to extract the candidate bounding box using the feature map and the input information, and the interaction encoding unit 23 configured to update the feature map using the candidate bounding box extracted by the area estimation unit 22 and the input information. The area estimation unit 22 can extract the candidate bounding box further using the mask generated by the segmentation head. The interaction encoding unit 23 can update the feature map further using the mask generated by the segmentation head. It is therefore possible to reduce cost for updating a DNN model.

(2) The area estimation unit 22 includes the first convolutional layer that is a learned neural network. The area estimation unit 22 generates a plurality of bounding boxes using the input information and extracts a bounding box with the highest evaluation value obtained by inputting each bounding box and the feature map to the first convolutional layer 22A, as the candidate bounding box. In a case where the mask calculated by the segmentation head 14 is further used, the area estimation unit 22 generates a plurality of bounding boxes so as to include an area indicated by the mask.

(3) The interaction encoding unit 23 includes the second convolutional layer 23A that is a learned neural network. The interaction encoding unit 23 creates an interaction map that is information on an existence probability of the object for each position, on the basis of the input information and inputs the interaction map and the feature map cut out using the candidate bounding box to the second convolutional layer 23A to calculate the updated feature map. In a case where the mask is further used, the interaction encoding unit 23 further inputs the mask to the second convolutional layer 23A.

(4) The area extraction system 1 includes the loss calculation unit 30 configured to update parameters of neural networks included in the area estimation unit and the interaction encoding unit. The loss calculation unit 30 acquires a pass or failure determination result by the user on the mask output by the segmentation head. In a case where the user makes failure determination on the mask, the loss calculation unit 30 causes the area estimation unit 22, the interaction encoding unit 23 and the segmentation head 14 to operate using new input information to update the mask and acquires a pass or failure determination result by the user on the updated mask. Then, in a case where the user makes pass determination on the mask, the loss calculation unit 30 updates the parameters using the loss function indicated in expression 1. The loss function includes the initial mask that is the mask generated first by the segmentation head, and the ground truth that is the mask for which the user makes pass determination.

In the embodiment described above, the image processing application 350 is executed by one arithmetic apparatus 300. However, the image processing application 350 may be implemented through operation by cooperation of a plurality of arithmetic apparatuses, in which case, it can be said that the image processing application 350 is implemented by the area extraction system.

In the embodiment described above, a configuration of the functional blocks is merely one example. Some functional components indicated as different functional blocks may be integrally constituted, or a component indicated in one functional block diagram may be divided into two or more functions. Further, part of the functions of each functional block may be provided to other functional blocks.

Embodiments and modifications described above may be combined. While various embodiments and modifications have been described above, the present invention is not limited to content thereof. Other aspects that can be considered within a scope of technical idea of the present invention are included in the scope of the present invention.

What is claimed is:

1. An area extraction method to be executed by a computer, the area extraction method comprising:
    an image acquisition step of acquiring a captured image;
    a feature extraction step of generating a feature map using the captured image;
    an area extraction step of extracting a candidate bounding box that is a bounding box indicating an area in which an object exists in the captured image using the feature map;
    a segmentation step of generating a mask that is a bounding box indicating the area in which the object exists in the captured image using the feature map and the candidate bounding box;
    a user input step of acquiring input information which is input by a user and which is information regarding the object in the captured image;
    an area estimation step of extracting the candidate bounding box using the feature map and the input information; and
    an interaction encoding step of updating the feature map using the candidate bounding box extracted in the area estimation step and the input information, wherein
        in the area estimation step, the candidate bounding box is further extracted using the mask generated in the segmentation step as an initial mask,
        in the interaction encoding step, the feature map is further updated using the mask generated in the segmentation step,
        the computer includes a first convolutional layer that is a learned neural network,
        in the area estimation step, a plurality of bounding boxes are generated using the input information, and the bounding box with a highest evaluation value obtained by inputting each of the bounding boxes and the feature map to the first convolutional layer, is extracted as a candidate bounding box, and
        in the area estimation step, in a case where the mask is further used, the plurality of bounding boxes are generated so as to include an area indicated by the mask.

2. The area extraction method according to claim 1, wherein the computer includes a second convolutional layer that is a learned neural network,
    in the interaction encoding step, an interaction map that is information on an existence probability of an object for each position is created on a basis of the input information, and the interaction map and the feature map cut out using the candidate bounding box are input to the second convolutional layer to calculate the updated feature map, and
    in the interaction encoding step, in a case where the mask is further used, the mask is further input to the second convolutional layer.

3. The area extraction method according to claim 1, further comprising:
    a loss calculation step of updating a parameter of a neural network provided at the computer,
    wherein in the loss calculation step, a pass or failure determination result by a user on the mask output in the segmentation step is acquired,
    in the loss calculation step, in a case where the user makes failure determination on the mask, the area estimation step, the interaction encoding step and the segmentation step are performed using new input information to update the mask, and a pass or failure determination result by the user on the updated mask is acquired,
    in the loss calculation step, in a case where the user makes pass determination on the mask, the parameter is updated using a loss function, and
    the loss function includes the initial mask that is the mask generated first in the segmentation step and a ground truth that is the mask for which the user makes pass determination.

4. An area extraction system comprising:
    an image acquisition unit configured to acquire a captured image;
    a feature extraction unit configured to generate a feature map using the captured image;
    an area extraction unit configured to extract a candidate bounding box that is a rectangle bounding box indicating an area in which an object exists in the captured image using the feature map;
    a segmentation head configured to generate a mask that is a closed area along a contour of the object in the captured image using the feature map and the candidate bounding box;
    a user input unit configured to acquire input information which is input by a user and which is information regarding the object in the captured image;
    an area estimation unit configured to extract the candidate bounding box using the feature map and the input information; and
    an interaction encoding unit configured to update the feature map using the candidate bounding box extracted by the area estimation unit and the input information, wherein
        the area estimation unit further extracts the candidate bounding box using the mask generated by the segmentation head as an initial mask, the interaction encoding unit further updates the feature map using the mask generated by the segmentation head, the area estimation unit includes a first convolutional layer that is a learned neural network, the area estimation unit generates a plurality of bounding boxes using the input information and extracts the bounding box with a highest evaluation value obtained by inputting each of the bounding boxes and the feature map to the first convolutional layer, as the candidate bounding box, and in a case where the mask is further used, the area estimation unit generates the plurality of bounding boxes so as to include an area indicated by the mask.

5. The area extraction system according to claim 4, wherein the interaction encoding unit includes a second convolutional layer that is a learned neural network, the interaction encoding unit creates an interaction map that is information on an existence probability of an object for each position on a basis of the input information and inputs the interaction map and the feature map cut out using the candidate bounding box to the second convolutional layer to calculate the updated feature map, and in a case where the mask is further used, the interaction encoding unit further inputs the mask to the second convolutional layer.

6. The area extraction system according to claim 4, further comprising:

a loss calculation unit configured to update parameters of neural networks included in the area estimation unit and the interaction encoding unit, wherein the loss calculation unit acquires a pass or failure determination result by a user on the mask output by the segmentation head, in a case where the user makes failure determination on the mask, the loss calculation unit causes the area estimation unit, the interaction encoding unit and the segmentation head to operate using new input information to update the mask and acquires a pass or failure determination by the user on the updated mask, in a case where the user makes pass determination on the mask, the loss calculation unit updates the parameters using a loss function, and the loss function includes the initial mask that is the mask generated first by the segmentation head and a ground truth that is the mask for which the user makes pass determination.

* * * * *